United States Patent

Diehl et al.

(10) Patent No.: US 7,547,069 B2
(45) Date of Patent: Jun. 16, 2009

(54) VEHICLE SEAT, PARTICULARLY A MOTOR VEHICLE SEAT

(75) Inventors: Andreas Diehl, Otterbach (DE); Norbert Heeg, Dahn (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/150,488

(22) Filed: Apr. 29, 2008

(65) Prior Publication Data

US 2008/0203789 A1 Aug. 28, 2008

Related U.S. Application Data

(63) Continuation of application No. PCT/EP2006/010391, filed on Oct. 28, 2006.

(30) Foreign Application Priority Data

Dec. 2, 2005 (DE) .................... 10 2005 057 623

(51) Int. Cl.
*B60N 2/10* (2006.01)
(52) U.S. Cl. ............. 297/362.11; 297/370; 297/354.12; 297/217.3; 297/217.2
(58) Field of Classification Search ............. 297/217.3, 297/362.11, 378.1, 378.13; 324/207.2, 207; 270/49
See application file for complete search history.

(56) References Cited

U.S. PATENT DOCUMENTS

| 4,550,508 | A | * | 11/1985 | Spaeth ..................... 33/501.19 |
| 5,634,689 | A | | 6/1997 | Putsch et al. |
| 5,889,400 | A | * | 3/1999 | Nakazawa ............... 324/207.2 |
| 6,007,152 | A | * | 12/1999 | Kojima et al. ............... 297/367 |
| 6,055,877 | A | * | 5/2000 | Welterlin et al. ............ 248/429 |
| 6,064,198 | A | * | 5/2000 | Wolf et al. ................ 324/207.2 |
| 6,454,354 | B1 | | 9/2002 | Vossmann et al. |
| 6,455,948 | B1 | * | 9/2002 | Berger ........................ 307/10.1 |
| 6,578,917 | B1 | * | 6/2003 | Aubert et al. ................ 297/317 |
| 6,623,077 | B1 | * | 9/2003 | Piaulet et al. ............... 297/330 |
| 6,695,405 | B2 | * | 2/2004 | Senseby et al. ........... 297/378.1 |
| 6,769,741 | B2 | * | 8/2004 | Denning ................ 297/378.13 |

(Continued)

FOREIGN PATENT DOCUMENTS

DE 44 36 101 A1 6/1995

(Continued)

*Primary Examiner*—David Dunn
*Assistant Examiner*—James Alex
(74) *Attorney, Agent, or Firm*—Womble Carlyle Sandridge & Rice, PLLC

(57) ABSTRACT

Disclosed is a vehicle seat (1), particularly a motor vehicle seat, comprising a seat part (3), at least one fitting (5) which is provided with a first fitting part (7) and a second fitting part (8) that can be swiveled relative to the first fitting part (7) about an axis (A), and a backrest (4) which is mounted on the seat part (3) by way of the fitting (5) and can be swiveled relative to the seat part (3) about the axis (A). A sensor (15) is provided on the first fitting part (7) while a signaler (14) is provided on the second fitting part (8). The sensor (15) transmits a signal by cooperating with the signaler (14) when the second fitting part (8) swivels relative to the first fitting part (7), the signal making it possible to determine the relative angular position of the fitting parts (7, 8).

20 Claims, 1 Drawing Sheet

U.S. PATENT DOCUMENTS

| | | | |
|---|---|---|---|
| 6,851,655 B2 * | 2/2005 | Kume et al. | 248/429 |
| 6,932,382 B2 * | 8/2005 | Hayes et al. | 280/735 |
| 7,032,973 B2 * | 4/2006 | Reubeuze | 297/378.13 |
| 7,108,306 B2 * | 9/2006 | Suda et al. | 296/65.08 |
| 7,152,922 B2 * | 12/2006 | Garland | 297/362.11 |
| 7,152,926 B2 * | 12/2006 | Wrobel | 297/378.13 |
| 7,275,791 B2 * | 10/2007 | Sakamaki | 297/362.14 |
| 2004/0041558 A1 * | 3/2004 | Hasegawa et al. | 324/207.25 |
| 2004/0189284 A1 * | 9/2004 | Haubold et al. | 324/207.2 |
| 2004/0245816 A1 | 12/2004 | Nock et al. | |
| 2004/0257068 A1 * | 12/2004 | Wolber et al. | 324/207.12 |
| 2004/0262973 A1 * | 12/2004 | Reubeuze et al. | 297/378.13 |
| 2005/0007101 A1 * | 1/2005 | Fahrlander et al. | 324/207.2 |
| 2005/0017564 A1 * | 1/2005 | Kayumi | 297/378.1 |
| 2005/0023877 A1 * | 2/2005 | Vermeulen | 297/378.13 |
| 2005/0127732 A1 | 6/2005 | Peters | |
| 2005/0229721 A1 | 10/2005 | Diehl et al. | |
| 2007/0069100 A1 | 3/2007 | Schuler et al. | |

FOREIGN PATENT DOCUMENTS

| | | |
|---|---|---|
| DE | 196 29 964 A1 | 1/1998 |
| DE | 102 29 369 A1 | 1/2003 |
| DE | 101 45 746 A1 | 4/2003 |
| DE | 102 06 303 A1 | 8/2003 |
| DE | 102 35 141 A1 | 2/2004 |
| DE | 20 2005 004 528 U1 | 7/2006 |
| EP | 1 334 866 B1 | 8/2003 |
| WO | WO 00/44582 | 8/2000 |
| WO | WO 2004/043733 | 5/2004 |
| WO | WO 2004/067329 A1 | 8/2004 |
| WO | WO 2006/000287 A1 | 1/2006 |

\* cited by examiner

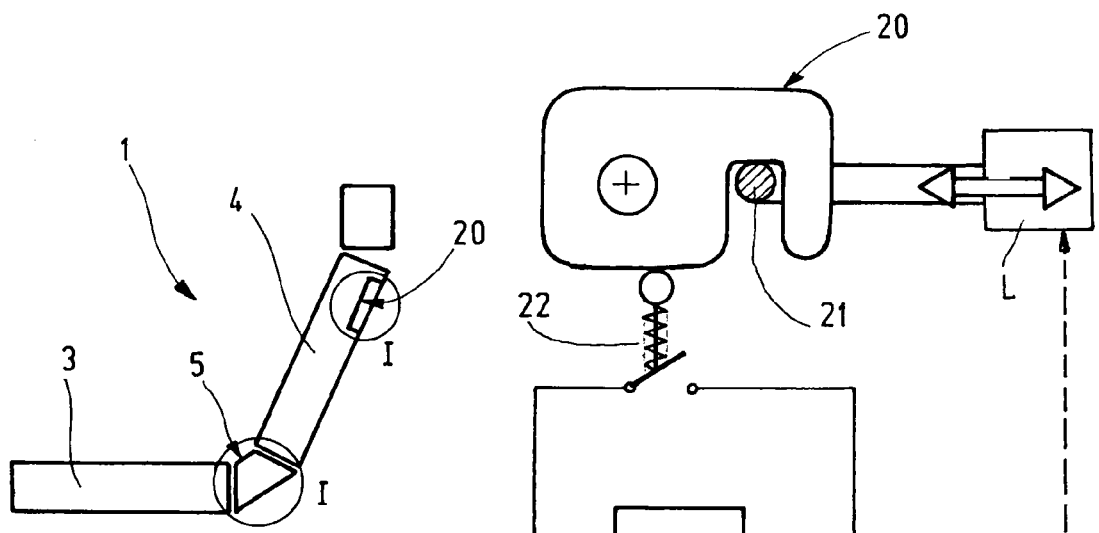
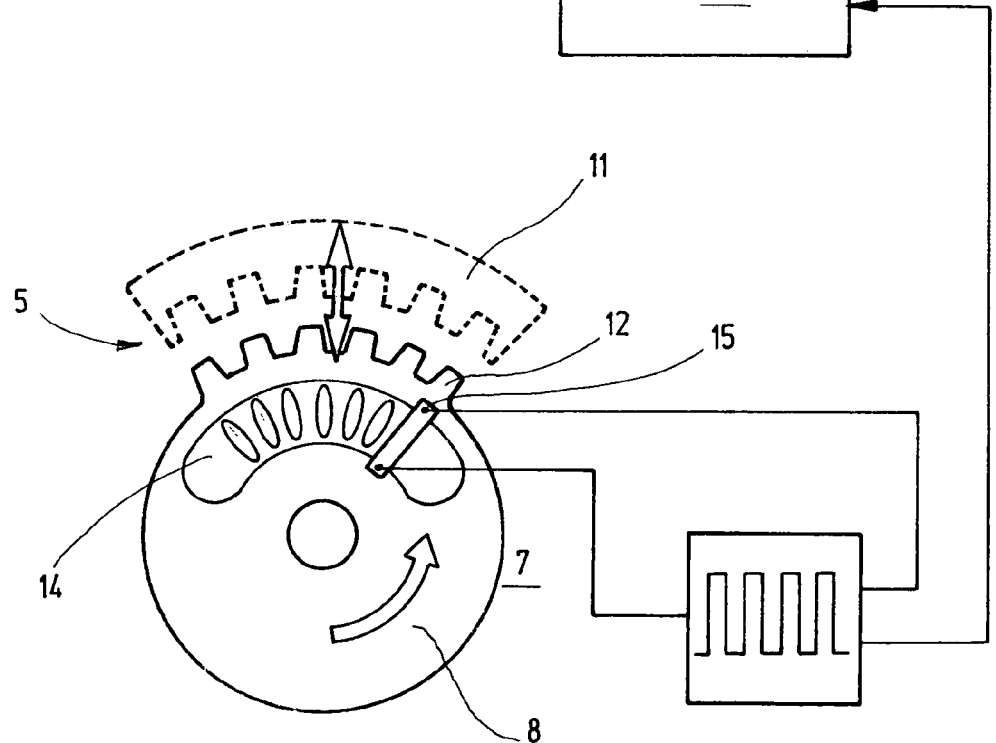
Fig.2
Fig.1

VEHICLE SEAT, PARTICULARLY A MOTOR VEHICLE SEAT

CROSS-REFERENCE TO RELATED APPLICATION

The present application is a continuation of International Application PCT/EP2006/010391, which was filed Oct. 28, 2006. The entire disclosure of International Application PCT/EP2006/010391, which was filed Oct. 28, 2006, is incorporated herein by reference.

TECHNICAL FIELD

The present invention relates to a vehicle seat, particularly a motor vehicle seat, with a seat part, at least one fitting which has a first fitting part and a second fitting part which is pivotable about an axis relative to the first fitting part, and a backrest which is attached by way of the fitting to the seat part and is pivotable about the axis relative to the seat part.

BACKGROUND OF THE INVENTION

Numerous vehicle seats of the above-described type, which have a free-standing backrest with lockable fittings, or a backrest which can be locked to the vehicle structure and has fittings which can be additionally locked or designed as simple joints, are known.

BRIEF SUMMARY OF SOME ASPECTS OF THE INVENTION

An aspect of the present invention is the provision of improvements, with respect to functional diversity and reliability, to a vehicle seat of the type mentioned above. In accordance with one aspect of the present invention, a vehicle seat, in particular a motor vehicle seat, includes a seat part, a backrest and at least one fitting. The fitting includes a first fitting part and a second fitting part which is pivotable about an axis relative to the first fitting part. The backrest is attached at least by way of the fitting to the seat part, so that the backrest is pivotable about the axis relative to the seat part. The fitting further includes a signaler that is on the second fitting part, and a sensor that is on the first fitting part. The sensor is responsive to the signaler so that the sensor outputs a signal when the second fitting part pivots relative to the first fitting part, and the signal is indicative of a relative angular position between the fitting parts.

Because a sensor is provided on the first fitting part and a signaler is provided on the second fitting part, with the sensor being responsive to (e.g., interacting with) the signaler to output a signal when the second fitting part pivots relative to the first fitting part, the signal makes it possible to determine the relative angular position of the fitting parts. Having this relative angular position information available makes it possible to determine and control the locking capacity of the fitting, the necessity of synchronizing two fittings or the reaching of a desired inclination of the backrest. These controlling actions may be incorporated into the controlling means (e.g., a controlling device) depending on whether motorized drives are present.

To provide a signal which can be resolved in a meaningful manner, the signaler is preferably designed as a periodic sequence of different regions, with the periods defining the resolution. Such regions are preferably alternately magnetized and non-magnetized regions or magnetized regions with an alternating direction of magnetization. The sensor is then preferably designed as a Hall sensor. A similar solution is described in DE 102 29 369 A1 for a longitudinal adjuster of a vehicle seat. However, optical solutions are also possible. The sensor is expediently connected to a control unit which evaluates the signals of the sensor. In particular, upon each change of the region of the signaler, the control unit receives a pulse from the sensor, counts the pulses and from them determines the relative angular position of the fitting parts in relation to each other.

The backrest can be locked by way of locking of the fitting. The fitting is locked by way of interaction between a locking element movably mounted on the first fitting part and a mating element provided on the second fitting part. The locking element and mating element are moved away from each other when the fitting is released. The backrest can be locked cumulatively or, alternatively, can be locked to the vehicle structure by way of a lock and a mating lock element which interacts with the lock.

When the exemplary embodiment of the invention is used for free-standing backrests, the checking of the locking capability of the fitting, which may be part of a synchronization of two fittings, is in the foreground (e.g., is a primary operational aspect). In this checking of the locking capability, the relative position between the locking element and the mating element is determined in order to check whether they are appropriately aligned for locking to take place, i.e. whether the locking element and the mating element are aligned with each other in such a manner that, as they move towards each other, they can pass directly into their position for interaction (engagement position) so as to avoid tooth on tooth positions and therefore to ensure maximum transmission of force. In the case of the backrest which can be locked to the vehicle structure, this is important in situations in which double locking takes place by way of both a fitting of this type and a backrest lock. If appropriate, the inclination of the backrest then has to be corrected so that the fitting can be locked. However, for the backrests, it is also of interest to link the information about the current inclination of the backrest with an interrogation of the locking state of the lock in order to check that the backrest is locked correctly.

Other aspects and advantages of the present invention will become apparent from the following.

BRIEF DESCRIPTION OF THE DRAWINGS

The invention is explained in more detail below with reference to an exemplary embodiment, which is illustrated in the drawings, together with modifications. In the drawings:

FIG. 1 shows a block circuit diagram incorporating those regions of the exemplary embodiment which are referred to by I in FIG. 2, with some optional parts being illustrated by dashed lines, and FIG. 2 shows a schematic illustration of the exemplary embodiment.

DETAILED DESCRIPTION

A vehicle seat 1 of a motor vehicle has a seat part 3 and a backrest 4 which is attached to the seat part 3 by way of two fittings 5 respectively positioned at the sides of the seat part 3, so that the backrest 4 is pivotable about an axis A relative to the seat part 3 and is preferably also adjustable with different inclinations.

The fitting 5 comprises a first fitting part 7, a second fitting part 8, which is pivotable about the axis A relative to the first fitting part 7, and a locking element 11 which is mounted on the first fitting part 7 in a manner such that it is movable relative to the second fitting part 8. For the locking of the fitting 5, or, more specifically, of the two fitting parts 7 and 8, the locking element 11 interacts with a mating element 12. The mating element 12 is formed on the second fitting part 8. In order to release the fitting 5, the locking element 11 can be pulled back from the mating element 12, i.e. the locking element 11 can be moved away from the mating element 12. The mating element 12 is preferably a toothed ring which is formed at least over part of the circumference of the second fitting part 8, i.e. is generally curved about the axis A. Accordingly, the locking element 11 bears a matching toothing, i.e. a toothing which interacts in a form-fitting manner. The allocation of the fitting parts 7 and 8 to the seat part 3 and backrest 4 depends on the application and on the construction space available in each case. In the relative system of the fitting parts 7 and 8, the first fitting part 7 is arbitrarily regarded to be stationary and the second fitting part 8 to be movable in the present description.

The fitting 5 can be, for example, a latching fitting as described in WO 00/44582 A1, or the fitting 5 can be of the type as described in DE 102 35 141 A1. In both types, the locking element 11 and the mating element 12 take up different relative positions both for the adjustment of the inclination of the backrest 4 in different use positions and for pivoting the backrest into non-use positions and, if appropriate, for securing the backrest 4 in the latter. However, the fitting 5 may also be designed, for example, as a geared fitting with a central free-pivoting means, as described in DE 102 06 303 A1, with the associated eccentric epicyclic gear being described, for example, in DE 44 36 101 A1 for a geared fitting without a central free-pivoting means. In the case of the last-mentioned geared fitting, the central driver and the fitting part supporting it may also be considered the fitting parts which can be pivoted relative to each other within the meaning of the present invention. The entire disclosure of each of the above-mentioned documents is expressly incorporated herein by reference.

A signaler 14 (e.g., stimuli) is provided on the second fitting part 8. In the exemplary embodiment, the signaler 14 is designed as a periodic sequence of strip-shaped, alternately magnetized and non-magnetized regions (or magnetized regions with an alternating direction of magnetization) that extends in the circumferential direction with respect to the axis A. The period of the magnetized regions is, as a maximum, the same size as the period of the teeth of the mating element 12, and preferably the period of the magnetized regions is half the size of the period of the teeth of the mating element 12. The signaler 14 is curved about the axis A and is arranged at a distance from the axis A.

A sensor 15 is provided on the first fitting part 7. The sensor 15 is arranged at the same distance from the axis A as the signaler 14. The sensor 15 interacts with the signaler 14. In the exemplary embodiment, the sensor 15 is designed as a Hall sensor. In accordance with a modified embodiment, instead of the magnetic interaction, the signaler 14 and the sensor 15 interact optically. For example, the signaler 14 may be in the form of a sequence of strips having different reflecting characteristics, and the sensor 15 may be in the form of a combination of a light-emitting diode and a photocell. The sensor 15 is connected to a control device 17.

When the fitting 5 is unlocked, i.e. the locking element 11 and the mating element are brought out of engagement, the backrest 4 can be pivoted relative to the seat part 3. An adjustment of the inclination preferably takes place by way of a motor, with the pivoting into a non-use position preferably taking place manually. When the backrest 4 is pivoted, the fitting parts 7 and 8 also pivot relative to each other. The signaler 14 is guided past the sensor 15. Upon each change in the magnetization, the sensor 15 outputs a signal, or, more precisely a pulse, which is counted by the control unit 17. The current relative angular position of the fitting parts 7 and 8 in relation to each other, with reference to a defined angular position during an initial initialization, is determined in the control unit 17 from the number of pulses.

In accordance with the fitting 5 of the exemplary embodiment, both the relative position between the locking element 11 and mating element 12, and the current inclination of the backrest 4 can be determined from the relative angular position of the fitting parts 7 and 8. The information about the relative position of the locking and mating elements 11, 12 with respect to one another can be used to check whether the locking element 11 and the mating element 12 are appropriately aligned with each other, i.e. whether locking is basically possible. The information about the current inclination of the backrest 4 can be used to check whether the desired final position (use or non-use position) has been reached, and then the locking is activated or else continued pivoting of the backrest 4 is required, and, if appropriate, the motorized drive of the backrest 4 has to continue to be actuated. In the case of longitudinally adjustable vehicle seats, the longitudinal position of the seat can be changed, if appropriate, if the distance from the front row of seats is too small. From a combination of both sets of information, a synchronization with the fitting 5 on the opposite side of the vehicle seat can be undertaken, i.e. an angular offset between the two fittings 5 can be compensated for by different locking (in terms of time or angle) of the two fittings 5.

The backrest 4 is preferably provided with a lock 20 by way of which the backrest 4 can be locked to the vehicle structure with a mating lock element 21. The mating lock element 21 may be a clip or bolt, or the like. In the exemplary embodiment, the mating lock element 21 is movable relative to the vehicle structure, for example linearly in the direction toward the lock 20, by way of a backrest drive unit L which can be actuated by the control unit 17, and therefore the inclination of the backrest 4 can be adjusted by motor. When the lock 20 is released, the backrest 4 can be pivoted into a non-use position. In a modified embodiment, the positions of lock 20 and mating lock element 21 are interchanged. In a simplified embodiment, the backrest drive unit L is omitted, i.e. the mating lock element 21 (or the lock 20) is connected fixedly to the vehicle structure.

The exemplary embodiment of the invention is supplemented by a further interrogation. A lock sensor 22, for example a microswitch, interrogates (e.g., determines) the locking state of the lock 20, for example by way of an interrogation of the position of a latch of the lock 20, and outputs a digital signal to the control unit 17. An AND link with the relative angular position of the fitting parts 7 and 8 or the current inclination of the backrest 4 ensures that correct locking of the backrest 4 is only indicated when the lock 20 is locked to the mating lock element 21 and the backrest 4 is at the correct inclination. If a backrest adjustment unit L is present, the control unit 17 uses the information from the sensor 15 to actuate the backrest adjustment unit L until the backrest 4, moved by the backrest drive unit L, is at the correct inclination for the locking of the fitting 5, i.e. an appropriate alignment of the locking element 11 and of the mating element 12 has been reached. Errors can also be detected, for example if the lock 20 is closed but the inclination of the backrest 4 is outside the backrest inclination range, i.e. the mating lock element 21 is located outside the lock 20.

It will be understood by those skilled in the art that while the present disclosure has been discussed above with reference to an exemplary embodiment and modifications, various additions, modifications and changes can be made thereto without departing from the spirit and scope of the invention as set forth in the claims.

That which is claimed:

1. A vehicle seat, comprising:
 a seat part;
 a backrest;
 at least one fitting including
  (a) a first fitting part,
  (b) a second fitting part which is pivotable about an axis relative to the first fitting part, wherein the backrest is attached at least by way of the fitting to the seat part so that the backrest is pivotable about the axis relative to the seat part,
  (c) a signaler that is on the second fitting part,
  (d) a sensor that is on the first fitting part and is responsive to the signaler so that
   (1) the sensor outputs a signal when the second fitting part pivots relative to the first fitting part, and
   (2) the signal is indicative of a relative angular position between the fitting parts,
  (e) a locking element movably mounted on the first fitting part, and
  (f) a mating element that is on the second fitting part, wherein the mating element interacts with the locking element to lock the fitting, the locking element and the mating element are disengaged with respect to one another while the fitting is unlocked, and the backrest is capable of being locked at least by way of the fitting being locked; and
 a control unit connected to the sensor for evaluating the signal from the sensor to determine the position of the locking element and the mating element with respect to one another, in order to determine whether the locking element and the mating element are appropriately aligned for locking the fitting.

2. The vehicle seat as claimed in claim 1, wherein the signaler is a periodic sequence of different regions.

3. The vehicle seat as claimed in claim 2, wherein the sensor is a Hall sensor.

4. The vehicle seat as claimed in claim 1, wherein:
 the signaler is a periodic sequence of different regions;
 the sensor is responsive to the periodic sequence of different regions so that the signal comprises pulses; and
 the control unit is operative for
  counting the pulses, and
  determining, at least by way of the counting of the pulses, the relative angular position between the fitting parts.

5. The vehicle seat as claimed in claim 1, wherein the control unit is operative for determining, at least by way of the signal, the relative angular position between the fitting parts.

6. The vehicle seat as claimed in claim 1, wherein:
 the vehicle seat has opposite first and second sides;
 the fitting is a first fitting located at the first side of the vehicle seat;
 the vehicle seat further comprises a second fitting that is located at the second side of the vehicle seat and includes
  (a) a first fitting part,
  (b) a second fitting part which is pivotable relative to the first fitting part of the second fitting, wherein the backrest is attached at least by way of the second fitting to the seat part so that the backrest is pivotable about the axis relative to the seat part,
  (c) a signaler that is on the second fitting part of the second fitting, and
  (d) a sensor that is on the first fitting part of the second fitting and is responsive to the signaler of the second fitting so that
   (1) the sensor of the second fitting outputs a signal when the second fitting part of the second fitting pivots relative to the first fitting part of the second fitting, and
   (2) the signal of the sensor of the second fitting is indicative of a relative angular position between the fitting parts of the second fitting; and
 the control unit is also connected to the sensor of the second fitting for synchronizing locking of the first and second fittings in a final position.

7. The vehicle seat as claimed in claim 1, wherein the mating element is a first mating element, and the vehicle seat further comprises a lock and a second mating element which interacts with the lock for locking the backrest to vehicle structure.

8. The vehicle seat as claimed in claim 7, further comprising a backrest drive unit for moving the second mating element or the lock relative to the vehicle structure while the second mating element and the lock are separated from one another.

9. A vehicle seat, comprising:
 a seat part;
 a backrest;
 a lock and a first mating element which interacts with the lock for locking the backrest to vehicle structure;
 a backrest drive unit for moving the first mating element or the lock relative to the vehicle structure while the first mating element and the lock are separated from one another;
 at least one fitting including
  (a) a first fitting part,
  (b) a second fitting part which is pivotable about an axis relative to the first fitting part, wherein the backrest is attached at least by way of the fitting to the seat part so that the backrest is pivotable about the axis relative to the seat part,
  (c) a signaler that is on the second fitting part,
  (d) a sensor that is on the first fitting part and is responsive to the signaler so that
   (1) the sensor outputs a signal when the second fitting part pivots relative to the first fitting part, and
   (2) the signal is indicative of a relative angular position between the fitting parts;
  (e) a locking element movably mounted on the first fitting part, and
  (f) a second mating element that is on the second fitting part, wherein the second mating element interacts with the locking element to lock the fitting, the locking element and the second mating element are disengaged with respect to one another while the fitting is unlocked, and the backrest is locked by way of the fitting while the fitting is locked; and
 a control unit connected to the sensor for evaluating the signal from the sensor, wherein the control unit is operative
  for determining, at least by way of the signal from the sensor, whether the locking element and the second mating element are appropriately aligned for locking the fitting,
  for actuating the backrest drive unit, while the backrest is locked to the vehicle structure by way of the first mating element and the lock, to cause the locking element and the second mating element to become appropriately aligned for locking the fitting, and so that the actuating of the backrest drive unit is responsive to the determining as to whether the locking element and the second mating element are appropriately aligned for locking the fitting.

10. The vehicle seat as claimed in claim 9, wherein the sensor is a first sensor, and the lock has a second sensor for determining whether the lock is in a locked state.

11. The vehicle seat as claimed in claim 10, wherein the control unit is operative for:
determining, at least by way of the signal from the first sensor, inclination of the backrest,
including determining whether the backrest is in a predetermined inclined position; and indicating correct locking of the backrest, wherein the indicating of the correct locking includes
linking information about the inclination of the backrest and information about the state of the lock, and
providing an indication of correct locking only if the lock is locked to the first mating element and the backrest is in the predetermined inclined position.

12. The vehicle seat as claimed in claim 3, wherein the periodic sequence of different regions is a periodic sequence of alternating magnetized and non-magnetized regions.

13. The vehicle seat as claimed in claim 3, wherein the periodic sequence of different regions is a periodic sequence of magnetized regions with an alternating direction of magnetization.

14. The vehicle seat as claimed in claim 4, wherein:
the sensor is a Hall sensor; and
the periodic sequence of different regions is selected from the group consisting of
(a) a periodic sequence of alternating magnetized and non-magnetized regions, and
(b) a periodic sequence of magnetized regions with an alternating direction of magnetization.

15. A vehicle seat, comprising:
a seat part;
a backrest; and
at least one fitting including
(a) a first fitting part,
(b) a second fitting part which is pivotable about an axis relative to the first fitting part, wherein the backrest is attached at least by way of the fitting to the seat part so that the backrest is pivotable about the axis relative to the seat part,
(c) a signaler that is on the second fitting part, wherein the signaler is a periodic sequence of different regions,
(d) a sensor that is on the first fitting part and is responsive to the signaler so that the sensor outputs a signal when the second fitting part pivots relative to the first fitting part, and the signal is indicative of a relative angular position between the fitting parts, wherein the sensor is responsive to the periodic sequence of different regions so that the signal comprises pulses,
(e) a locking element movably mounted on the first fitting part, and
(f) a mating element that is on the second fitting part, wherein the mating element interacts with the locking element to lock the fitting, the locking element and the mating element are disengaged with respect to one another while the fitting is unlocked, and the backrest is locked by way of the fitting while the fitting is locked; and
a control unit connected to the sensor for evaluating the signal from the sensor, wherein
the control unit is operative for counting the pulses and determining, at least by way of the counting of the pulses, the relative angular position between the fitting parts, and
the control unit is operative for determining, at least from the relative angular position between the fitting parts, whether the locking element and the mating element are appropriately aligned for locking the fitting.

16. The vehicle seat as claimed in claim 5, wherein the control unit is operative for determining inclination of the backrest at least from the relative angular position between the fitting parts.

17. The vehicle seat as claimed in claim 16, wherein the control unit is operative for determining, at least from the relative angular position between the fitting parts, whether a final position of the backrest has been reached.

18. The vehicle seat as claimed in claim 1, further comprising a backrest drive unit for pivoting the backrest about the axis relative to the seat part, wherein the control unit is operative for actuating the backrest drive unit to cause the locking element and the mating element to become appropriately aligned for locking the fitting, and the control unit's actuating of the backrest drive unit is responsive to the control unit's evaluating of the signal from the sensor.

19. The vehicle seat as claimed in claim 8, wherein while the fitting is unlocked and the backrest is locked to vehicle structure by way of the second mating element, the lock and the backrest drive unit:
the backrest drive unit is operative for moving the second mating element and the lock relative to the vehicle structure, so that the backrest is pivoted about the axis relative to the seat part, and the first mating element is moved relative to the locking element, to cause the locking element and the first mating element to become appropriately aligned for locking the fitting.

20. The vehicle seat as claimed in claim 9, wherein while the fitting is unlocked and the backrest is locked to vehicle structure by way of the first mating element, the lock and the backrest drive unit:
the backrest drive unit is operative for moving the first mating element and the lock relative to the vehicle structure, so that the backrest is pivoted about the axis relative to the seat part, and the second mating element is moved relative to the locking element, to cause the locking element and the second mating element to become appropriately aligned for locking the fitting.

* * * * *